United States Patent [19]

Vasconi et al.

[11] Patent Number: 4,965,848

[45] Date of Patent: Oct. 23, 1990

[54] CONTROL CIRCUIT FOR A PERMANENT MAGNET OR CONSTANT EXCITATION DIRECT CURRENT MOTOR, PARTICULARLY FOR WASHING MACHINES

[75] Inventors: Enrico Vasconi, Varano Borghi; Carlo Mazzucchelli, Fagnano Olona; Diego Torriani, Cernobbio; Mario Giganti, Milan, all of Italy

[73] Assignee: Whirlpool International B.V., Eindhoven, Netherlands

[21] Appl. No.: 319,006

[22] Filed: Mar. 3, 1989

[30] Foreign Application Priority Data

Mar. 4, 1988 [IT] Italy .................. 19661 A/88

[51] Int. Cl.⁵ .............................. H02P 5/00
[52] U.S. Cl. .................... 388/815; 388/915; 318/799
[58] Field of Search .................. 318/798–802, 318/806, 599, 812; 388/809–815, 821, 910, 915, 833, 816–817, 902

[56] References Cited

U.S. PATENT DOCUMENTS 3,943,420  7/1974  Hind ........................... 388/853 X
4,001,666  1/1977  Grenfell ...................... 318/161 X
4,513,231  2/1983  Kuno et al. .................. 388/817 X
4,578,626  3/1985  Richter ........................ 388/806
4,723,219  2/1988  Beyer et al. .................. 318/572
4,749,927  4/1986  Rodel et al. ................. 388/811 X

FOREIGN PATENT DOCUMENTS 3221093  5/1982  Fed. Rep. of Germany .

Primary Examiner—Shoop, Jr. William M.
Assistant Examiner—David Martin
Attorney, Agent, or Firm—Bernard Franzblau

[57] ABSTRACT

A motor control circuit measures the motor voltage to determine actual motor speed. This speed voltage is the sum of the back emf and armature loses. The control circuit receives a reference voltage proportional to the desired motor speed and a further signal voltage indicative of the motor armature losses. These three voltages are combined to provide a first error signal representing the difference between the reference voltage and the motor back emf. This error signal is substractively combined with a signal representative of the motor power to produce a control signal for a modulator circuit which in turn controls a semiconductor switch in series with the motor.

11 Claims, 2 Drawing Sheets

CONTROL CIRCUIT FOR A PERMANENT MAGNET OR CONSTANT EXCITATION DIRECT CURRENT MOTOR, PARTICULARLY FOR WASHING MACHINES

BACKGROUND OF THE INVENTION

This invention relates to a control circuit for permanent magnet or constant excitation direct current motors, particularly for washing machines, the control circuit comprising reference means for providing a reference signal ($V_R$) indicative of a desired motor speed, measuring means for measuring the actual motor speed, modulator means (28) receiving a control signal ($V_3$) in order to control at least one static switch (5) in series with the motor (1), and control signal generating means for generating the control signal in dependence on the difference between the motor speed measured and the desired motor speed.

A circuit of the aforesaid type is known from the German patent application DE No. 3221093 which describes a circuit for regulating the rotational speed of a DC motor. In the known circuit, a tachometer dynamo is fixed onto the shaft of said motor, said dynamo generating a signal which is proportional to the motor rotational speed. This speed signal is fed to an electronic circuit which acts on the motor to regulate its speed, when required.

In the case of tachometer dynamos, their cost is relatively high and their installation is often laborious and costly.

SUMMARY OF THE INVENTION

The main object of the present invention is therefore to provide an electric motor control circuit which operates accurately without such a costly dynamo.

A further object is to provide an electric motor control circuit which enables the motor to operate substantially at constant power within determined limits of torque and rotational speed.

These object are attained by a circuit according to the preamble, which is characterized in that the control circuit comprises means (23) for providing a signal ($V_P$) representative of the supply power absorbed by the motor (1) and the measuring means comprises voltage measurement means (8) for measuring a voltage signal ($V_1$) across the terminals (11, 12) of the motor (1), said voltage signal ($V_1$) being the sum of the motor counter electromotive force and armature losses. Compensator means (18) provide a signal ($V_2$) representative of the armature losses of the motor (1). The control signal generating means comprise means responsive to the voltage signal ($V_1$), the signal ($V_2$) due to the armature losses and the reference signal ($V_R$) for generating an output signal ($V_4$) representative of the difference between the reference signal and the counter electromotive force, and means for generating as the control signal a signal ($V_6$) indicative of the difference between said output signal ($V_4$) and the signal ($V_P$) representative of the motor power.

DETAILED DESCRIPTION OF THE PREFERRED EMBODIMENTS

Figure 1:
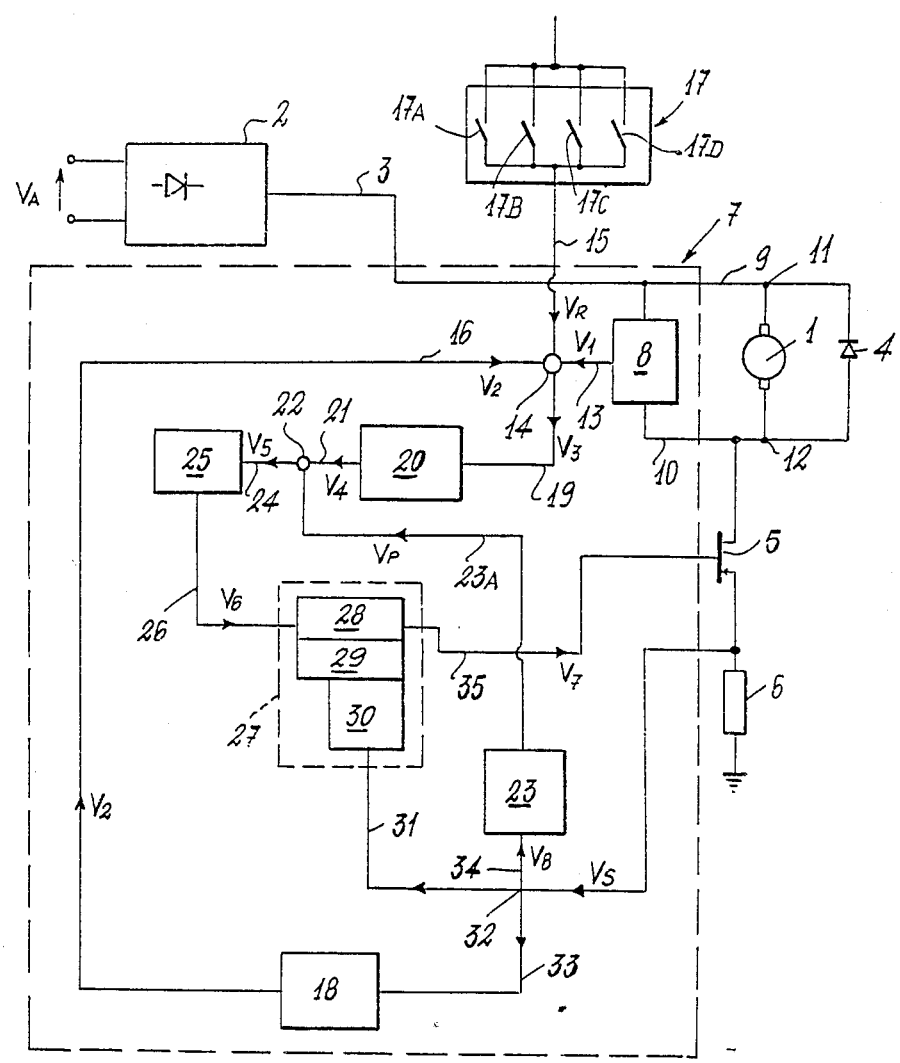
FIG. 1 is a block diagram of the circuit according to the present invention applied to a direct current electric motor.

In FIG. 1, the reference numeral 1 indicates a direct current (d.c.) motor of permanent magnet or constant excitation type, particularly for washing machines. This motor is powered by an alternating mains voltage $V_A$ which, on passing through a rectifer 2, is converted into direct current and is fed through a branch 3 to said motor 1. The motor is connected in parallel with a normal stabilizer diode 4 and in series with a static switch (power MOS transistor such as a NMOS or PMOS) 5 and a resistor 6 connected to ground.

The d.c. motor 1 is connected to a circuit 7 which control its operation by regulating the rotor speed according to the requirements of each individual stage of operation of the washing machine.

The control circuit 7 comprises a differential amplifier 8 which measures at the branches 8 and 10 the voltage across the terminals 11 and 12 of the motor 1. This motor voltage includes a back emf component proportional to the motor speed and an IR component, where I is the motor current and R is the motor resistance. This amplifier is connected by a branch 13 to a summing node 14. An interface 17 and a compensator means 18 for armature losses (i.e. armature loss detector) are also connected to this node by branches 15 and 16 respectively. In order to compensate the IR component of motor voltage, a voltage $V_2$ indicative of the motor current (i.e. IR) is supplied to node 14 via line 16.

The interface 17 comprises various switches which close selectively in accordance with the program which the washing machine is required to perform. Specifically, in the example described herein, the switch 17A relates to the wash, the switch 17B relates to the distribution of the laundry in the tub around the tub walls, and the switches 17C and 17D relate to a first and second spin stage, respectively. Closing one of these switches causes the interface to feed to the node 14 a reference signal $V_R$ for the control circuit 7, this signal representing a reference value indicative of the desired motor speed. The voltage $V_2$ proportional to (IR) is subtracted at the summing node 14 from the IR component in the voltage $V_1$ so that the output voltage $V_3$ is a signal voltage indicative of the difference between the desired (ref.) speed ($V_R$) and the actual motor speed (back emf component of the motor voltage).

From the node 14 there extends a branch 19 to an error amplifier 20 connected by a branch 21 to a summing node 22, to which there is connected by means of a branch 23A, a control element 23 the function of which will be described hereinafter.

A branch 24 extends from the node 22 to a power amplifier 25 connected in turn by a branch 26 to an integrated circuit 27. This circuit mainly comprises three elements: a modulator 28, an oscillator 29 and a comparator 30 with its output (within the integrated circuit 27) connected to a flip-flop which limits the current absorbed by the motor 1. The comparator 30 is connected by a branch 31 to a node 32 from which branches 33 and 34 extend to the comparator 18 and control element 23, respectively. A signal $V_S$ taken from the line connecting the static switch 5 to the resistor 6 is fed to the node 32.

Finally, from the integrated circuit 27 a branch 35 extends to connect the integrated circuit to the static switch 5 to allow this switch to be controlled by said integrated circuit and thus enable the circuit 7 to control the operation of the motor 1.

Assuming now that the motor 1 is in operation and that the laundry wash stage has been chosen on the interface 17 (switch 17A closed), the interface feeds the reference signal $V_R$ to the node 14. Through the branches 9 and 10 the amplifier 8 receives the signal taken from across the terminals 11 and 12 of the motor 1, this signal being substantially the sum of the counter electromotive force E and the armature losses IR of the motor 1, the term "armature losses" signifying the various losses present in the motor, such as those arising at the two branches and those due to the electrical resistance of the rotor.

The signal is amplified and then fed as the signal V1 to the node 14, to which in addition to the signal $V_R$ there also arrives a signal $V_2$ from the comparator means 18. The signal $V_2$ is specifically representative of the armature losses of the motor 1 and is substantially equal to the IR component present in the signal $V_1$ which reaches the node 14 from the differential amplifier 8.

In the summing node 14 these signals are combined (subtracted) so that in its output branch 19 there is a signal $V_3$ present which is substantially representative of only the difference between the reference signal $V_R$ and the counter electromotive force E of the motor 1 i.e. a velocity difference (error) signal.

The signal $V_3$ is thus fed through said branch 19 to the error amplifier 20 where it is amplified and from which it is fed as a signal $V_4$ to the summing node 22. This node also receives, through the branch 23A, a signal $V_P$ generated by the control element 23. This signal is represenative of the mains power absorbed by the d.c. motor 1.

Specifically, the signal $V_4$ acts as the reference signal for controlling the power of the motor 1. This control is done by combining said signal $V_4$ with the signal $V_P$ originating from the control element 23. This control enables the power curve of the motor 1 to be varied according to the particular loads to which it is subjected, i.e. according to the operating mode selected for the washing machine. To accomplish this, the components of the circuit 7 are dimensioned so as to provide (within determined limits of torque and rotational speed) a constant power from the motor 1, graphically represented by a hyperbola, while at the same time enabling the rotational speed of the washing machine drum to be limited to values advantageously between 250 r.p.m. and 1200 r.p.m. This prevents the power generated by the motor 1 from causing mechanical instability in the washing machine structure. From the node 22 there is therefore fed through the branch 24 a signal $V_5$ which represents the difference between $V_4$ and $V_P$. The signal $V_5$ (also $V_6$) is derived from the velocity error signal $V_3$ and the signal $V_P$ indicative of motor power.

During the operation of the motor 1, this difference is substantially equal to the value of $V_4$ because the signal $V_P$ is negligible compared with said signal $V_4$. However, during transient states (such as passage from the wash stage to the distribution stage or better still from the distribution stage to the spin stage), the signal $V_P$ becomes comparable to the signal $V_4$. A combination is therefore made at the node 22 between the dynamic reference signal ($V_4$) generated by the amplifier 20, already in the saturation state, and an error signal $V_P$. This combination results in an output $V_5$ from said node 22.

The signal $V_5$ is amplified by the amplifier 25 which in turn operates on the integrated circuit 27 by virtue of the signal $V_6$ generated by said amplifier 25. The signal $V_6$ is derived from the speed error signal $V_3$ and the signal $V_P$ indicative of absorbed motor power. The motor is thereby energized as a linear combination of $V_3$ and $V_P$ so that motor current is reduced when the motor power increases or when the actual speed exceeds the reference speed. Thus, an accurate regulation of motor speed is obtained. Furthermore, motor power is limited so as to prevent instability of the washing machine. Specifically, the signal $V_6$ is fed to the modulator 28 which by combining said signal (modulating signal) $V_6$ with a signal of sawtooth or like configuration generated by the oscillator 29, generates a control signal $V_7$ which is fed through the branch 35 to the static switch 5.

The signal $V_7$ is a signal of period T (equal to the sawtooth) and is "high" for a time t ($t \leq T$) defined by the crossover between the signal $V_6$ and the sawtooth signal generated by the oscillator 29. The time t determines the duty cycle of the static switch 5.

In particular, during normal operation of the motor 1 the time t enables the motor to operate at a rotational speed $n_1$. In this situation, as stated, the amplifier 25 operates on the signal $V_5$ which is substantially equal to the value of $V_4$.

During a transient state, i.e. when passing from one load on the motor 1 to a different load, for example, from a stage in which the motor is required to rotate at a speed of $n_1$ to a different stage in which the required speed $n_2$ is greater than $n_1$, the power absorbed by the motor increases. This power change, detected as the signal $V_8$ by the element 23 through the branch 34, is fed in the form of a signal $V_P$ to the node 22 where it is combined with the signal $V_4$. This combination of signals generates a signal $V_5$ which when amplified by amplifier 25 and fed as the signal $V_6$ to the modulator 28, is used by this modulator to vary the time t (duty cycle) of the control signal $V_7$. This variation, which in the case under examination produces an increase in the time t, enables the static switch 5 to vary the operating cycle of the motor by, in practice, or rather increasing, its rotational speed, as required.

In addition, as already stated, by virtue of the control element 23 and the subtractive combination of the signals $V_P$ and $V_4$ made at the node 22, any increase in the power of the motor 1 beyond preset known limits is prevented, these limits being those beyond which mechanical instability could arise within the washing machine.

Finally, the modulator 28 makes it possible to limit the motor power both for high torques (such as those arising during the distribution of the laundry within the washing machine drum) and thus low speeds, and also for low torques and high speeds (this being the case when spinning).

Figure 2:
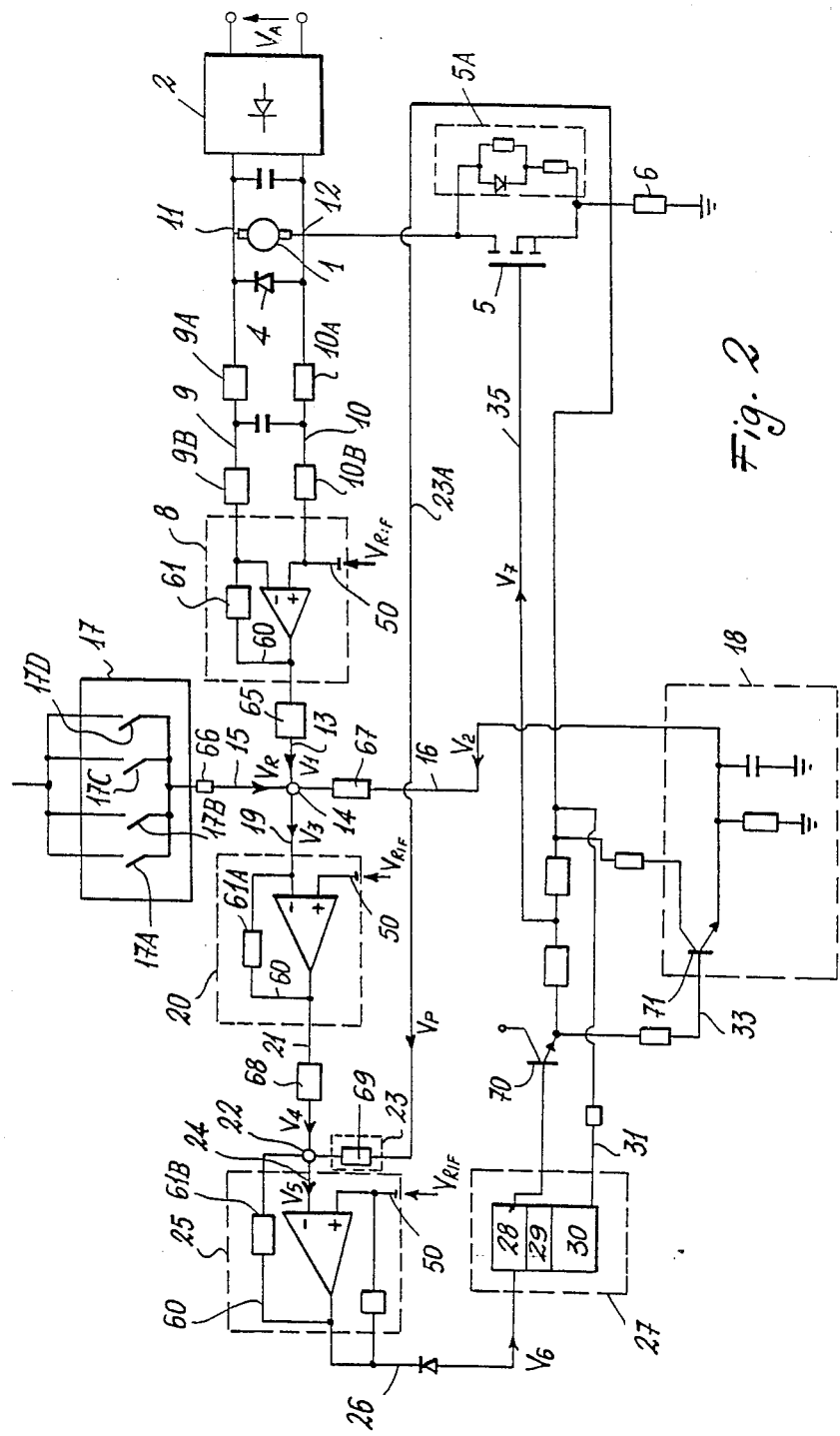
FIG. 2 is an electrical schematic diagram of one embodiment of the circuit of FIG. 1, but showing only the main components.

FIG. 2 shows one embodiment of the circuit according to the present invention. In this figure, parts identical to those of FIG. 1 are indicated by the same reference numerals.

Furthermore, FIG. 2 shows only certain circuit components while omitting others such as those which provide the varying biasing and powering for the components shown.

Specifically, in FIG. 2 it can be seen that in parallel with the static switch 5 there is connected a protection block 5A for the switch. In the branches 9 and 10, which connect the motor 1 to the amplifier 8, there is connected resistors 9A, B and 10A, B, respectively.

In addition, each amplifier comprises points 50 to which there is fed a reference voltage $V_{rif}$ for their operation, and also comprises negative feedback branches 60 in which there are connected dynamic impedances 61A, B. Resistors 65, 66, 67, 68 and 69 are connected into the branches 13, 15, 16 which lead to the node 14 and in the branches 21 and 23A which lead to the node 22.

The voltage $V_P$ applied to node 22 via resistor 69 indicates the current supplied to the motor by the rectifier 2. Since the output voltage of the rectifier 2 is substantially constant the voltage $V_P$ indicates the power absorbed by the motor (1).

At the output of the integrated circuit 27 there are also provided two transistors 70 and 71. The transistor 71, connected into the branch 33, forms part of the armature compensator 18 which can be likened to a sample and hold circuit, in which the transistor applies the logic signal.

A control circuit constructed as described enables the motor rotational speed to be measured as a function of the voltage taken across the motor terminals with due allowance being made for the armature losses arising in the motor. In this manner the regulation of said rotational speed is much more accurate under any load condition than that which can be obtained by known electric motor control devices and/or circuits. In addition, the circuit described in the present application prevents the motor from absorbing mains power to any extent which could lead to mechanical instability of the washing machine.

We claim:

1. A motor control circuit comprising: reference means for providing a reference signal ($V_R$) indicative of a desired motor speed, means for measuring motor voltage to determine actual motor speed, said measuring means deriving an actual speed voltage ($V_1$) which includes motor counter emf and motor armature losses, modulator means for receiving a control signal in order to control in turn at least one static switch connected in series with the motor, and control signal generating means for generating the control signal as a function of a difference between the actual motor speed and the desired motor speed, wherein the control circuit comprises means for providing a signal ($V_P$) representative of power absorbed by the motor, compensator means for proividing a compensation signal ($V_2$) representative of motor armature losses, wherein the control signal generating means comprises means responsive to the speed voltage signal ($V_1$), the compensation signal ($V_2$) and the reference signal ($V_R$) for generating a further signal ($V_4$) representative of the difference between the reference signal and the motor counter emf, and means for generating a control signal ($V_6$) for the modulator means indicative of the difference between said further signal ($V_4$) and the motor power signal ($V_P$).

2. A circuit as claimed in claim 1, wherein the modulator means further comprise, an oscillator generating a sawtooth-like signal.

3. A circuit as claimed in claim 2, wherein the modulator means further comprises a comparator having its output connected to a flip-flop to limit the current supplied to the motor.

4. A circuit as claimed in claim 1, wherein the compensator means exhibit substantially the characteristic of a sample and hold circuit.

5. A circuit as claimed in claim 1, wherein the motor voltage measuring means comprises a differential amplifier, wherein the further signal generating means comprises error amplifier means and the control signal generating means comprises amplifier means, wherein said error amplifier means and said amplifier means are operational amplifiers having at least one negative feedback branch including a dynamic impedance.

6. A circuit as claimed in claim 1, further comprising a summing node which receives the motor speed voltage signal ($V_1$), the compensation signal ($V_2$) and the reference signal ($V_R$).

7. A circuit as claimed in claim 1, further comprising, at an output of the further signal generating means, a summing node which receives the further signal ($V_4$) from said further signal generating means and the motor power signal ($V_P$).

8. A circuit as claimed in claim 1, wherein the modulator means further comprises, an oscillator, and a comparator having its output connected to a flip-flop to limit the current supplied to the motor.

9. A control circuit for a washing machine motor comprising: a solid state switch connected between the motor and an electric energy source,
   means for supplying a reference signal indicative of the desired motor speed,
   means for measuring the motor voltage to derive a first signal voltage,
   means for measuring the motor current to derive a second signal voltage,
   means for measuring the power absorbed by the motor to derive a third signal voltage,
   means for combining the reference signal, the first signal voltage and the second signal voltage to derive a control signal indicative of the difference between the desired motor speed and the actual motor speed,
   means for controlling the solid state switch in response to the control signal in order to control the motor speed to the desired speed, and
   means for adding said third signal voltage to the control signal in order to limit the motor power to a level which prevents mechanical instability of the washing machine.

10. A circuit as claimed in claim 9 wherein the means for controlling the solid state switch includes means for limiting the motor current.

11. A circuit as claimed in claim 10 wherein the means for controlling the solid state switch comprises a pulse width modulator controlled by the control signal, and wherein the means for measuring the motor current comprises a sample and hold circuit for sampling the motor current and holding said current when the solid state switch is opened.

* * * * *